United States Patent Office 3,781,277
Patented Dec. 25, 1973

3,781,277
DIOXO-THIAZOLIDINYL DERIVATIVES OF
6-AMINOPENICILLANIC ACID
Ronnie D. Carroll, East Lyme, Conn., assignor to Pfizer
Inc., New York, N.Y.
No Drawing. Filed July 27, 1971, Ser. No. 166,561
Int. Cl. C07d 99/16
U.S. Cl. 260—239.1       5 Claims

ABSTRACT OF THE DISCLOSURE

Novel dioxo-thiazolidinyl derivatives of 6-aminopenicillanic acid which exhibit activity against a variety of gram negative organisms are disclosed. A typical embodiment of 6-[2-(2,4-dioxo-5-thiazolidinyl)acetamido]penicillanic acid.

BACKGROUND OF THE INVENTION

This invention relates to new antibiotic compounds and their salts, and more particularly to novel dioxo-thiazolidinyl derivatives of 6-aminopenicillanic acid and pharmaceutically acceptable salts thereof which exhibit activity against a variety of gram negative organisms.

The compounds in the group belonging to the family of penicillins possess the general formula indicated below wherein the acyl moiety on the 6-aminopenicillanic acid is derived from a carboxylic acid or functional derivative thereof such as an acyl chloride or anhydride.

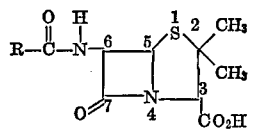

The pharmacodynamic and antibiotic properties of a given penicillin are determined to a great extent by the nature of the R group. The most widely used penicillins are those wherein the R moiety is represented by benzyl, phenoxymethyl- and α-phenoxyethyl-. While these well-known analogs are highly antagonistic toward gram-positive micro-organisms they are relatively ineffective against the so-called antibiotic resistant strains of bacteria, and of limited gram-negative activity, important causes of severe infections and deaths in hospitals today and are readily destroyed by penicillinase. Consequently, drugs which will combat rise in Staphylococci incidence and fatality and gram-negative infections, e.g., Pseudomonas, are of immeasurable value to the medical profession.

Recent efforts to improve the profile of activity within the family of penicillins have resulted in the synthetic of α-carboxybenzylpenicillin (U.S. Pat. 3,142,673), a broad spectrum antibiotic with greater efficacy against gram-negative infections via the parenteral route of administration.

SUMMARY OF THE INVENTION

The novel dioxo-thiazolidinyl derivatives of 6-aminopenicillanic acid disclosed herein have the formula:

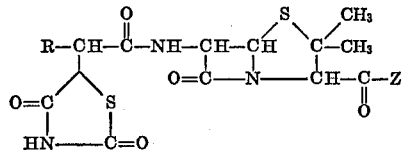

wherein R is hydrogen, 2-thienyl, 3-thienyl, phenyl or substituted phenyl wherein the substituent is chloro, bromo, or methyl; and Z is amino, acetoxymethoxy, pivaloyloxymethyl, 1-acetoxyethoxy or OM wherein M is hydrogen or a pharmaceutically-acceptable cation.

Included in the present invention are the pharmaceutically acceptable salts of these novel penicillins, that is, non-toxic metal salts such as the sodium, calcium and potassium salts and, non-toxic ammonium and substituted ammonium salts, for example, salts of such non-toxic amines a procaine, dibenzylamine, N,N′-dibenzylethylenediamine, 1-ephenamine, N-benzyl-β-phenethylamine and other amine which have been used to form salts with benzylpenicillin.

DETAILED DESCRIPTION OF THE INVENTION

Those compounds wherein R is hydrogen are made by reacting thiourea with an equimolar or excess quantity of fumaric acid at about from 100 to 120° C. for about from 2 to 4 hours. The resulting intermediate is isolated and recrystallized from a suitable solvent such as water and then dried to yield crystalline 2-imino-4-oxo-5-thiazolidine acetic acid.

The 2-imino-4-oxo-5-thiazolidine acetic aicd is then refluxed with a 20% aqueous solution of sulfuric acid for about one to three hours. The reaction mixture is allowed to cool to room temperature and the resultant solid is isolated and dried, yielding crystalline 2,4-dioxo-thiazolidine-5-acetic acid.

The 2,4-dioxothiazolidine-5-acetic acid is then reacted with an excess of oxalyl chloride by refluxing for about two hours. A catalytic amount of dimethylformamide may also be included. The excess oxalyl chloride is then removed, leaving 2,4-dioxothiazolidine-5-acetyl chloride in the form of an oil, which is used directly as an acylating agent in the next reaction.

This acid chloride is then dissolved in a reaction-inert solvent such as methylene chloride or the like and added to a basic solution of 6-aminopenicillanic acid in methylene chloride or the like, the temperature being maintained at about —5° C. to 5° C. The mixture is stirred for about one hour or until the reaction is substantially complete. The excess methylene chloride is removed and the residue acidified to a pH of about 1 to 4 and the penicillin is extracted into a suitable solvent such as ethyl acetate, followed by solvent removal under reduced pressure. The resulting product can then be further isolated as the N-ethylpiperidine salt which is then converted to the potassium or sodium salt of 6-[2-(2,4-dioxo-5-thiazolidinyl)acetamido]penicillanic acid by standard techniques.

Compounds wherein R is phenyl or substituted phenyl are made by reacting phenylsuccinic acid or a substituted phenylsuccinic acid in a solution of acetyl chloride with at least an equimolar proportion of thionyl chloride. The mixture is refluxed for about 1 to 3 hours, cooled to room temperature and the solvents removed under reduced pressure. The resulting residue is treated with a suitable solvent mixture such as ether/hexane in order to produce a crystalline phenylsuccinic anhydride.

The phenylsuccinic anhydride is then reacted with an excess of N-bromosuccinimide and benzoyl peroxide in carbon tetrachloride or other suitable solvent. This mixture is refluxed for about 24 hours, and the resultant solid is purified by solvent washing and drying to yield a phenylmaleic anhydride.

The phenylmaleic anhydride is then reacted with a suitable base, such as potassium hydroxide in water, by heating on a steam bath for about three hours. The resulting solution is cooled and acidified to a pH of about 1 to 3. The precipitate which is formed is then further purified by extraction with organic solvent such as ether, followed by solvent removal to yield a phenylmaleic acid.

The phenylmaleic acid is then reacted with thiourea in a manner similar to that previously described in the preparation of 2-imino-4-oxo-5-thiazolidine acetic, to yield a 2-imino-4-oxo-5-(2-phenyl)thiazolidine acetic acid.

This compound is then converted to 2,4-dioxo-2-phenyl-5-thiazolidine acid, which in turn is converted to 2,4-dioxo-2-phenyl-5-thiazolidineacetyl chloride as previously described. The 2,4-dioxo-2-phenyl-5-thiazolidine-acetyl chloride is then used to acylate a solution of 6-aminopenicillanic acid as previously described, with the resultant product isolated as the N-ethylpiperidine salt, which is in turn converted to the potassium or sodium salt of 6-[2-phenyl-(2,4-dioxo-5 - thiazolidinyl)acetamido]penicillanic acid by standard technique.

Those compounds in which R is 2-thienyl or 3-thienyl can be prepared by using either 2-thienylsuccinic acid or 3-thienylsuccinic acid in the same series of reactions as employed with phenylsuccinic acid in the procedure previously described.

The acetoxymethyl, pivaloyloxymethyl or 1-acetoxymethyl derivatives can be made by reacting the sodium or potassium salts of the final penicillins with the corresponding acylating agents, e.g. acetoxymethyl bromide, pivaloyloxymethyl chloride and 1-acetoxymethyl chloride. A typical procedure for the preparation of these compounds can be found in J. Med. Chem., 13, 607 (1970).

The penicillin amides of this invention are obtained by conversion of the desired penicillin to a simple or mixed anhydride, followed by amidation of the anhydride by ammonia or an amine according to well known procedures. The simple or mixed anhydrides are prepared by reacting the sodium or potassium salt of the desired penicillin with one equivalent of an acid chloride, such as sec-butyl chloroformate, and then treating the resultant anhydride with ammonium or an amine. The anhydrides need not be isolated. It is frequently more convenient and practical to use it in the form of the solution in which it is prepared. The amidation reaction is conducted in a reaction-inert solvent, preferably a non-aqueous solvent, such as chloroform, dimethylacetamide, tetrahydrofuran, dioxane, methylisobutylketone and acetone, at a temperature of from about —10° C. to about 50° C. Ammonia, when used as an amidating agent to produce the simple unsubstituted amide, can be used in a solution in a non-aqueous solvent. Alternatively, and preferably, it is used in the form of an aqueous alkaline solution of an ammonium salt. The insoluble amide derivative precipitates from the reaction mixture.

The preferred compounds of this invention are those wherein R is hydrogen or phenyl and Z is OM wherein M is hydrogen or an alkali metal. Such compounds as well as the remaining compounds within the scope of this invention are effective antibiotics both in vivo and in vitro. They are, for example effective in treating a variety of susceptible gram-positive and gram-negative infections in animals, and can be expected to be active in man. For this purpose, the pure materials or mixtures thereof with other antibiotics can be employed. They may be administered alone or in combination with a pharmaceutical carrier selected on the basis of the chosen route of administration and standard pharmaceutical practice. For parenteral administration, they are best used in the form of a sterile aqueous solution which may be either aqueous such as water, isotonic saline, isotonic dextrose Ringer's solution, or non-aqueous such as fatty oils of vegetable origin (cotton seed, peanut oil, corn, sesame), or other non-aqueous vehicles which will not interfere with the therapeutic efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents; for example, propylene glycol, glycerol, sorbitol, etc.; buffering agents, as well as local anesthetics and inorganic salts to afford desirable pharmacological properties.

In the utilization of the chemotherapeutic activity of those compounds of the present invention which form basic salts, pharmaceutically acceptable salts will of course be employed. Although water insolubility, high toxicity, or lack of crystalline nature may make some salt species unsuitable or less desirable for use as such in a given pharmaceutical application, the water insoluble or toxic salts can be converted to the corresponding acids by decomposition of the salts as described above, or alternately they can be converted to any desired pharmaceutically acceptable basic salt. The preferred pharmaceutically acceptable salts include the sodium, aluminum, potassium, calcium, magnesium, ammonium and substituted ammonium salts, e.g., procaine, dibenzylamine, N,N'-dibenzylethylenediamine, N,N'-bis(dehydroabietyl)-ethylenediamine, 1-ephenamine, N-ethylpiperidine, N-benzyl-β-phenethylamine, triethylamine, as well as salts with other amines which have been used to form salts with benzylpenicillin.

The novel penicillins described herein exhibit in vitro activity against a wide variety of microorganisms, including both gram-positive and gram-negative bacteria. Their useful activity can readily be demonstrated by in vitro tests against various organisms in a brain-heart infusion medium by the usual two-fold serial dilution technique.

These novel penicillins are also effective antibacterial agents in vivo in animals and can be expected to be active in man, via the parenteral route of administration.

The parenteral dosage levels for the herein described compounds are, in general, on the order of up to 100 mg/kg. of body weight per day.

The antimicrobial spectra of 6-[2-(2,4-dioxo-5-thiazolidinyl)acetamido]penicillanic acid against several bacteria is presented below. The tests were run under standardized conditions in which nutrient broth containing various concentrations of the test material was seeded with the particular organism specified, and the minimum concentration (MIC) at which growth of each organism failed to occur was observed and recorded. The test material was tested as the N-ethylpiperidine salt.

TABLE I

In vitro activity of 6-[2-(2,4-dioxo-5-thiazolidinyl)acetamido]penicillanic acid (MIC; mcg./ml.)

| Organism: | N-ethylpiperidine salt MIC |
|---|---|
| Staphloccus aureus (resistant) | 0.78 |
| Staphloccus aureus | >200.00 |
| Streptococcus pyogenes | 0.04 |
| Streptococcus faecalis | 3.12 |
| Diplococcus pneumoniae | 0.19 |
| Escherichia coli | 50.00 |
| Aerobacter aerogenes | >200.00 |
| Pseudomonus aeuriginosa | >200.00 |
| Proteus vulgaris | 6.25 |
| Proteus rettgeri | >200.00 |
| Proteus morgani | 200.00 |
| Proteus mirabilis | 6.25 |
| Salmonella typhosa | 12.5 |
| Salmonella choleralsuis | 6.25 |
| Shigella sonnei | 100.00 |
| Klebsiella pneumoniae | 12.5 |
| Vibrio comma | 1.56 |
| Proteus multocida | 0.39 |

Table II presents in vivo activity of 6-[2-(2,4-dioxo-5-thiazolidinyl)acetamido]penicillanic acid against several experimental infections in mice. The test compound, in the form of the N-ethylpiperidine salt, is administered to the infected mice by a multiple dosing regimen in which the first dose is given 0.5 hour after inoculation and is repeated four and twenty-four hours later.

TABLE II

In vivo data for 6-[2-(2,4-dioxo-5-thiazolidinyl)acetamido]penicillin acid vs. several bacterial infections in mice

| Dose (mg./kg.): | E. coli | | Staph. aureus | |
|---|---|---|---|---|
| | PO | SQ | PO | SQ |
| 200 | 0/5 | 5/5 | | |
| 100 | | | 0/10 | 7/10 |
| 50 | 0/5 | 0/2 | | |
| 25 | | | 0/10 | 6/10 |

NOTE.—Ratio of survivors/total mice.

The following examples are provided to illustrate in greater detail the manner of practicing the present invention. They are, however, not to be construed as limiting the scope thereof in any way.

EXAMPLE 1

2-imino-4-oxo-5-thiazolidineacetic acid

A glass pressure bottle was charged with a slurry of 26.4 g. (0.27 mole) of thiourea and 40.0 g. (0.34 mole) of fumaric acid in 32 ml. of distilled water. The reaction was then stirred and heated to 110° C. for three hours and allowed to cool to room temperature. The solid material in the bomb was collected by suction and washed with ice water and then recrystallized from 1500 ml. of hot water to give after suction filtration, washing with cold water and drying in vacuum of $P_2O_5$, 31.6 g. (67%) of white crystals M.P. 245° (dec.).

2,4-dioxothiazolidine-5-acetic acid

A flask was charged with a slurry of 72.7 g. (0.41 mole) of 2-imino-4-oxo-5-thiazolidineacetic acid in 727 ml. of 20% aqueous sulfuric acid. The mixture was refluxed for two hours as the starting material gradually passed into solution. The reaction was then allowed to cool slowly to room temperature as a crop of white crystals precipitated. The solid was collected by suction filtration and washed well with cold water. The cake was dried in vacuum over $P_2O_5$ affording 34.3 g. (46%) of white crystals M.P. 168°–171° C. (dec.).

2,4-dioxothiazolidine-5-acetyl chloride

A flame dried flask under a nitrogen atmosphere was charged with 4.0 g. (0.02 mole) of 2,4-dioxothiazolidine-5-acetic acid, 12 m. of oxalyl chloride and 2 drops of dry dimethylformamide. The reaction was refluxed for two hours and the excess oxalyl chloride was removed at reduced pressure to give 4.3 g. of a yellow oil. An infrared analysis indicated a high quality acid chloride which was used directly in the next reaction.

6-[2 - (2,4 - dioxo-5-thiazolidinyl)acetamido]penicillanic acid 1-ethylpiperidine salt A slurry of 4.75 g. (0.02 mole) of 6-aminopenicillanic acid in 40 ml. of methylene chloride was treated with 6.1 ml. (0.04 mole) of triethylamine. After two hours at room temperature the nearly clear solution was filtered to remove small amounts of undissolved solid. The solution was cooled to −10° C. and the above acid chloride in 50 ml. of methylene chloride was added dropwise to the 6-aminopenicillanic acid solution at such a rate that the temperature did not rise above −5° C. The reaction was allowed to warm slowly to room temperature and the methylene chloride was removed at reduced pressure. The residue was treated by shaking with ethyl acetate and water as it was acidified to pH 3.0 with dilute HCl. The ethyl acetate solution was then treated with a slight excess of 2% sodium bicarbonate with shaking. This basic solution was backwashed with ethyl acetate and the ethyl acetate extracts were discarded. The solution was then layered with ethyl acetate and acidified to pH 3.0 with dilute HCl. The resulting ethyl acetate solution was washed with water and saturated brine and dried over anhydrous sodium sulfate. Removal of solvent at reduced pressure afforded 6.0 g. of a yellow foam. This was redissolved in 40 ml. of ethyl acetate and treated with 2.2 ml. of dry N-ethylpiperidine. An immediate precipitate of the amine salt formed which was collected by suction filtration, washed with ethyl acetate and then ether and dried in vacuum over $P_2O_5$ to give 4.6 g. (43%) of manilla solid M.P. 130° C. (dec.).

The N-ethylpiperidine salt was converted to the potassimum salt as follows: benzene (50 ml.) was placed in a 250 ml. three-necked flask and heated to the boiling point. The N-ethylpiperidine salt (3.04 g., 5 mmole) was added to the refluxing benzene which was then cooled to room temperature. Potassium ethylhexanoate (3.2 ml. of a 26% acetone solution) was added and the mixture heated to 45° C. for three minutes. It was allowed to cool to room temperature then chilled to 0° C., the precipitated potassium salt of the desired product was filtered and dried.

The sodium salt was produced in like manner by substitution of sodium ethylhexanoate for potassium ethylhexanoate.

EXAMPLE II

Phenylsuccinic anhydride

To a solution of 25 g. (0.128 mole) of phenylsuccinic acid in 122 g. (1.54 moles) of acetyl chloride was added 20.1 g. (0.168 mole) of purified thionyl chloride. The resulting solution was refluxed for two hours and then cooled to room temperature. The solvents were removed at reduced pressure and the residue was dissolved in about 100 ml. of ether, and about 200 ml. of hexane was added. An oil separated and the supernatent solvent was decanted. An additional 100 ml. of hexane was added and with vigorous stirring crystals began to form. These were collected by suction filtration and dried affording 17.2 g. (76%) of white crystals M.P. 46°–49° C.

Phenylmaleic anhydride

A slurry of 17.0 g. (0.097 mole) of phenylsuccinic acid, 34.5 g. (0.19 mole) of N-bromosuccinimide, 375 ml. of carbon tetrachloride and 0.19 g. of benzoyl peroxide was refluxed gently for 24 hours. The solids remaining out of solution after cooling to room temperature were collected by suction filtration and washed with hot benzene. The filtrate was then reduced to about 15 ml. volume and allowed to stand in the cold for 2 hours. A small amount of solid separated which was collected and discarded. The filtrate was then reduced to about 75 ml. volume and partially purified by vacuum distillation. The distillate crystallized upon collection and was recrystallized from acetone/pentane to give 6.5 g. (39%) of white solid M.P. 112–116° C.

Phenylmaleic acid

A slurry of 6.5 g. (0.037 mole) of phenylmaleic anhydride in a solution of 4.2 g. of potassium hydroxide in 50 ml. of water was heated on a steam bath for three hours. The resulting clear solution was cooled in an ice bath and acidified to pH 1.0 with 6 N HCl. A precipitate formed which was immediately dissolved in ether. The ether solution was washed with water and saturated brine and dried over anhydrous sodium sulfate. Removal of solvent at reduced pressure afforded 2.5 g. (36%) of white crystals M.P. 117–121° C.

2-imino-4-oxo-5-(2-phenyl)thiazolidine acetic acid

A slurry of 50 g. (0.26 mole) of phenylmaleic acid, 12.9 g. (0.17 mole) of thiourea and 2000 ml. of water in a glass pressure bottle was heated at 115° for 5 hours. A solution formed which was allowed to cool to room temperature. The volume was reduced under vacuum to about 400 ml. whereupon a large crop of crystals began to separate. These were collected and then recrystallized 6 times from acetone to give 10 grams (24%) of solid which contained >95% of the desired isomeric product as established from NMR analysis M.P. 115°–120°.

2,4-dioxo-α-phenyl-5-thiazolidineacetic acid

The procedure for 2,4-dioxothiazolidine-5-acetic acid described in Example I was then followed to give the above compound in a 70% yield.

2,4-dioxo-2-phenyl-5-thiazolidineacetyl chloride

The procedure for 2,4-dioxothiazolidine-5-acetyl chloride described in Example I was then followed to give the above compound in a 100% yield.

6[2-phenyl-(2,4-dioxo-5-thiazolidinyl)acetamido]penicillanic acid 1-ethyl-piperidine salt The procedure for 6 - [2 - (2,4-dioxo-5-thiazolidinyl) acetamido]penicillanic acid 1-ethylpiperidine salts described in Example I was then followed to give the above compound in a 25% yield. The sodium salt was then produced by the procedure described in Example I.

EXAMPLE III

Ethyl α-cyano-β-(2-thienyl)acrylate

A solution of 2-thiophene aldehyde (0.20 mole) and ethyl cyanoacetate (0.22 mole) in benzene (500 ml.) and ammonium acetate (150 mg.) was refluxed for about 2 hours with the continuous removal of water through a Dean-Stark water trap. About 3.5 ml. of water was collected. The solution was cooled to room temperature and washed well with water and saturated brine and dried over anhydrous sodium sulfate. The benzene was distilled at reduced pressure and the residue was fractionated at 0.1 mm. to give the above product as a colorless liquid.

Ethyl α,β-dicyano-β-(2-thienyl)propionate

To 0.20 mole of ethyl α-cyano-β-(2-thienyl)acrylate is added 80 ml. of 50% alcohol and 20.0 g. (0.40 mole) of sodium cyanide powder. The reaction mixture became warm and the ester dissolved rapidly. The reaction was completed by heating on a steam bath for about 10 minutes. To the solution was added 400 ml. of water and the reaction was decomposed by the dropwise addition of excess concentrated hydrochloric acid (caution-HCN evolution). This causes the precipitation of a yellow oil which on rapid stirring overnight afforded a yellow crystalline mass. This was collected by suction filtration and washed with cold water and used directly in the following reaction.

2-thienylsuccinic acid

The above ester (0.20 mole) was refluxed with 150 ml. of concentrated hydrochloric acid for five hours. The ester gradually passed into solution and upon cooling white crystals of product separated. These were collected by suction filtration and washed with cold water and then dried in vacuum over $P_2O_5$ to give the above product.

The reaction sequence as described in Example II is then followed using 2-ethylsuccinic acid instead of phenyl-succinic acid to eventually produce 6-[2-2′-thienyl-(2,4-dioxo-5-thiazolidinyl)acetamide]penicillanic acid N-ethylpiperidine salt which is then converted to the sodum salt by the procedure described in Example I.

EXAMPLE IV

The procedure of Example III is repeated with the exception that 3-thiophene aldehyde is used instead of 2-thiophene aldehyde to produce the corresponding 3-thienyl compounds. The 3-thienylsuccinic acid so produced is then used in the reaction sequence described in Example II to produce 6 - [2 - 3′-thienyl-(2,4-dioxo-5-thiazolidinyl)acetamido]penicillanic acid N-ethylpiperidine salt which is then converted to the sodium salt by the procedure described in Example I.

EXAMPLE V

The procedure as described in Example II is repeated except that p-chlorophenylsuccinic acid, p-bromophenyl-succinic acid and p-methylphenyl succinic acid are used respectively to produce the corresponding substituted penicillin.

EXAMPLE VI

The sodium salt of 6 - [2 - (2,4-dioxo-5-thiazolidinyl) acetamido]penicillanic acid is treated in boiling acetone with an excess of acetoxymethyl bromide to yield the acetoxymethyl derivative.

EXAMPLE VII

The sodium salt of 6 -[2 - phenyl-(2,4-dioxo-5-thiazolidinyl)acetamido]penicillanic acid is treated in boiling acetone with an excess of pivaloyloxymethyl chloride to yield the pivaloyloxymethyl derivative.

EXAMPLE VIII

The potassium salt of 6-[2-(2,4-dioxo-5-thiazolidinyl) acetamido]penicillanic acid is treated in boiling acetone with an excess of 1-acetoxyethyl chloride to yield the 1-acetoxyethyl derivative.

EXAMPLE IX

One equivalent of the potassium salt of 6-[2-(2,4-dioxo-5-thiazolidinyl)acetamido]penicillanic acid as a slurry in methylene chloride is treated at room temperature with sec-butyl chloroformate. After two hours the reaction mixture is filtered to remove the potassium chloride. No attempt is made to isolate the mixed anhydride but it is stirred rapidly in methylene chloride with excess dilute ammonium hydroxide. After 15 minutes the methylene chloride layer is washed with water and sodium chloride and dried over sodium sulfate. Removal of solvent affords the amide of 6-[2-(2,4-dioxo-5-thiazolidinyl)acetamide] penicillanic acid as a solid.

What is claimed is:

1. A compound having the formula:

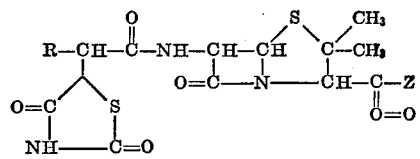

wherein R is hydrogen, 2-thienyl, 3-thienyl, phenyl, or substituted phenyl wherein the substituent is chloro, bromo or methyl; and Z is amino, acetoxymethoxy, pivaloyloxy-methoxy, 1-acetoxyethoxy or OM wherein M is hydrogen or a "pharmaceutically acceptable" cation.

2. A compound as claimed in claim 1 in which R is hydrogen and Z is OM wherein M is H.

3. A compound as claimed in claim 1 in which R is phenyl.

4. A compound as claimed in claim 1 in which R is 2-thienyl.

5. A compound as claimed in claim 1 in which R is 3-thienyl.

References Cited

UNITED STATES PATENTS

| | | | |
|---|---|---|---|
| 3,558,602 | 1/1971 | Alburn et al. | 260—239.1 |
| 3,577,408 | 5/1971 | Alburn et al. | 260—239.1 |
| 3,647,783 | 3/1972 | Pirie | 260—239.1 |

NICHOLAS S. RIZZO, Primary Examiner

U.S. Cl. X.R.

424—271